March 29, 1955  E. I. LOUD, JR  2,704,960
STEREOSCOPIC PLOTTING INSTRUMENT
Filed Aug. 10, 1953

EDWARD I. LOUD, JR.
INVENTOR

United States Patent Office 2,704,960
Patented Mar. 29, 1955

2,704,960

STEREOSCOPIC PLOTTING INSTRUMENT

Edward I. Loud, Jr., Arlington, Va., assignor to the United States of America as represented by the Secretary of the Interior Application August 10, 1953, Serial No. 373,463

2 Claims. (Cl. 88—29)

(Granted under Title 35, U. S. Code (1952), sec. 266)

The invention described herein may be manufactured and used by or for the Government of the United States for governmental purposes without the payment to me of any royalty thereon in accordance with the provision of the act of April 30, 1928 (Ch. 460, 45 Stat. L. 467), 35 U. S. C. 266.

This invention relates to a plotting instrument, and more particularly, to a plotting instrument for plotting map detail from aerial photographs.

Modern methods of making maps from aerial photographs require that the photographs be observed stereoscopically in pairs. If the compilation from the stereoscopic model, as it is termed, is to meet required accuracy standards, the photographs must be printed on glass or other stable material and oriented in a precision stereoplotting instrument. The multiplex device is an example of such a precision instrument. A check of a completed manuscript often reveals small details apparent in the photographs under a stereoscope that were omitted in the compilation made with the precision instrument; yet heretofore there has existed no simple means of transferring the omitted details to the map while at the same time observing stereoscopically the photo prints. Previously, such omissions have been added either by reorienting the photographs in the large precision instrument or by use of special detail plotting instruments. However, in revising the small details or in adding details to the otherwise complete and accurate map, it is not always efficient to reorient the photographs in the original plotting instrument, and the special devices for detailing have not been entirely satisfactory. If the omission was simple enough, it could be plotted point by point using proportional dividers, but this is a time consuming operation.

Accordingly, an object of the present invention is to provide an improved instrument for transferring detail from aerial photographs to a map.

Another object of the invention is to provide an instrument which enables the cartographer to view a pair of photographs stereoscopically to identify features, and to trace their outlines simultaneously onto a base map.

Another object of the invention is to provide an instrument of the type described which is simple to operate and can be set up for operation very quickly.

Another object of the invention is to provide an instrument for making minor corrections and additions to multiplex manuscripts using the same photography as was used in the original compilation.

These and other objects and advantages of the invention will be made clear by reference to the ensuing description and accompanying drawings in which.

Figure 1:
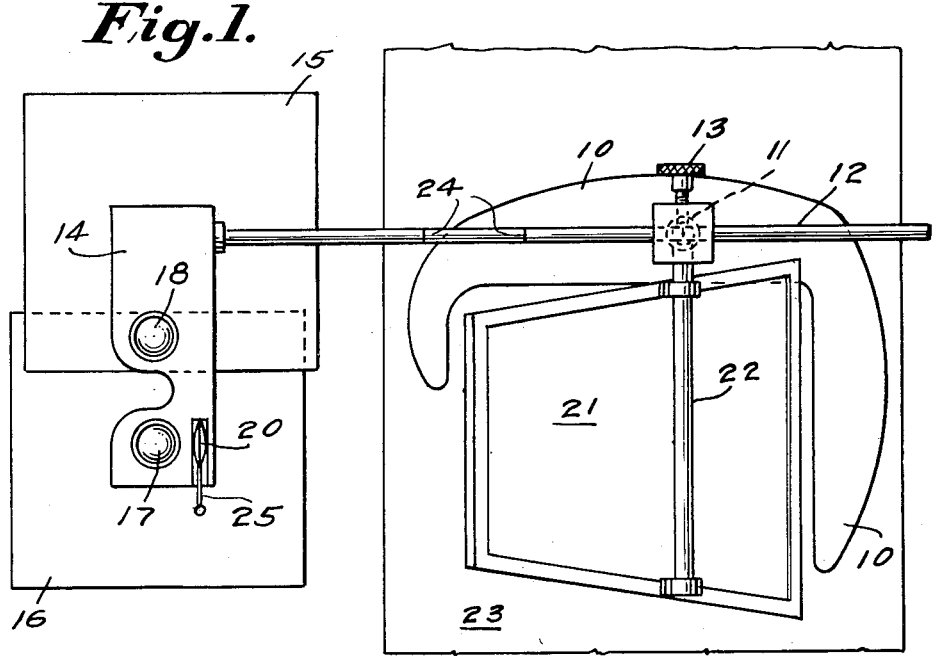
Figure 1 is a plan view, partially diagrammatic, of the device of this invention showing the device in operating position with respect to a map and an overlapping pair of aerial photographs.

The plotting instrument, which may be designated as a stereodetailer, broadly comprises a lens-type stereoscope, means for supporting the stereoscope above a pair of overlapping photographs for stereoscopic observation thereof, and an optical system associated with the stereoscope for simultaneously viewing a map working surface. The stereodetailer combines the principles of the camera lucida with the lens-type stereoscope in a simple, portable, desk top instrument.

Referring to the drawings in detail, the instrument is shown as having a base member 10, of such configuration as to cover a minimum of the map working surface, supporting a vertical standard 11 on which a horizontal arm 12 is adjustably mounted. Thumb screw 13 enables the horizontal arm 12 to be secured in a desired position. A lens-type stereoscope 14 is carried by one end of the horizontal arm 12 and is shown in position over overlapping aerial photographs 15 and 16. Lenses 17 and 18 provide means by which the aerial photos can be viewed to give a magnified stereoscopic image. A semitransparent mirror 19 is mounted in the stereoscope 14 directly under one of the lens eyepieces and permits the eye to see through it to the photograph below while at the same time directing the vision through a third lens 20 to a front surface mirror 21 carried by a cross rod 22 on the standard 11. The image of one photograph is thereby superimposed on the image of the map surface designated as 23. The map is reflected once in the large mirror 21 and the second time in the semitransparent mirror 19.

The distance between the two mirrors can be varied by sliding the horizontal arm 12 in or out through the block on the vertical standard 11. This adjustment governs the map enlargement ratio. Settings for three normal ratios are scribed on the horizontal arm as at 24.

The photo lenses 17 and 18 are of a fixed magnifying power. The map lens 20, in the embodiment shown, is one of a set of three, the particular one of which is chosen according to the distance that has been set between the two mirrors. Means are provided as shown at 25 for clamping the replaceable lenses in position in the stereoscope 14.

Figure 2:
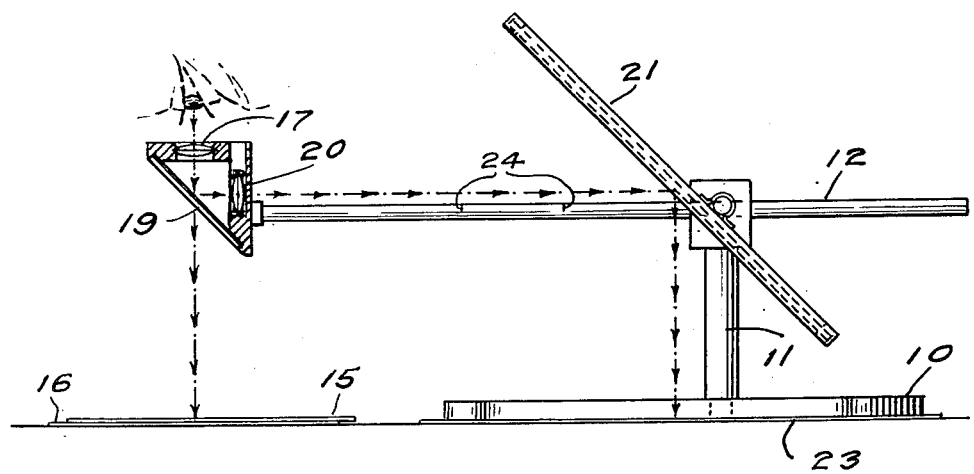
Figure 2 is a side elevation, partially diagrammatic, of the device of Fig. 1 also showing the device in operating position.

In the elevational view of the device shown in Fig. 2, the left eyepiece is directly behind the right eyepiece and these two eyepieces are alike except that the left has no mirror and no map lens. When the map image and the image of the righthand photo print have been brought into coincidence by shifting the photo print as necessary, the lefthand photo can be introduced and positioned to provide a stereoscopic view of the area. Only one eye sees the superimposed map image, with the effect that the lines of the map give the illusion of relief seeming to conform to the relief in the photo model. The omitted detail may now be observed on the photographs and transferred to the map.

No provision is made for any tilt of the photographs as is done in some precision instruments, but this is not necessary since the device is designed to position only small areas at a time to the abundant detail of the completed manuscript.

The enlargement of the photographs can be varied by changing the distance between the eyepiece and large mirror and by inserting a suitable lens at the eyepiece to keep the optical distance the same. The instrument for example may be designed for multiplex photography in which the focal length is either 4, 5.2, or 6 inches, and since flights are so planned that the average multiplex projection distance will be about 14.2 inches, only three normal ratios of 2.4X, 2.7X and 3.5X are marked on the horizontal slide, and only three lenses are needed. Obviously, however, the design may be reworked so that any desired enlargement ratio may be obtained.

Advantages of the invention are the provision of a simple, cheap, portable, and sufficiently accurate instrument for compiling or checking the small detail of a map using the major planimetric detail as a frame or reference. The provision of a magnified stereoscopic view in a small device is a great aid to plotting small detail. While its principal use is in conjunction with map compilations by large precision photogrammetric instruments, it may readily be adapted to any use involving stereoplotting procedures.

It will be appreciated from a reading of the foregoing specification that the invention herein described is susceptible of various changes and modifications without departing from the spirit and scope thereof as defined in the appended claims.

What is claimed is:

1. A plotting instrument comprising a stereoscope having a pair of lenses, means for supporting said stereoscope above a pair of photographs for stereoscopic observation thereof, a semi-transparent mirror positioned in the optical path between one of said lenses and said photographs whereby a second optical path is provided, a lens and a mirror in said second optical path whereby said photographs and a working surface may simultaneously be viewed through said stereoscope, and means for adjusting the distance between said lenses and said mirror in the second optical path whereby the enlargement ratio of working surface to photographs may be varied.

2. An instrument for plotting map detail from aerial photographs comprising a base member having a vertical standard thereon, a horizontal arm supported by said standard, a stereoscope having a pair of magnifying lenses carried by said horizontal arm whereby a pair of photographs may be stereoscopically observed, a semi-transparent mirror and a third lens in said stereoscope and a mirror carried by said standard providing a second optical path whereby said photographs and a map surface may be simultaneously observed, and means for adjusting the position of said horizontal arm whereby the distance between said stereoscope and the second mirror may be varied to vary the enlargement ratio of map surface to photograph.

References Cited in the file of this patent

UNITED STATES PATENTS

| | | |
|---|---|---|
| 2,111,198 | Vice | Mar. 15, 1938 |
| 2,229,309 | Ryker | Jan. 21, 1941 |
| 2,352,644 | Linderman et al. | July 4, 1944 |
| 2,636,416 | Platt | Apr. 28, 1953 |

FOREIGN PATENTS

| | | |
|---|---|---|
| 655,935 | France | Dec. 22, 1928 |